United States Patent
De Feo et al.

(10) Patent No.: US 12,460,148 B2
(45) Date of Patent: *Nov. 4, 2025

(54) SPIRO COMPOUND AS DETERGENT ADDITIVE IN LUBRICANTS FOR MOTORIZATION SYSTEMS

(71) Applicant: TOTALENERGIES ONETECH, Courbevoie (FR)

(72) Inventors: Modestino De Feo, Solaize (FR); Gregory Chao, Solaize (FR); Steve Faure, Solaize (FR)

(73) Assignee: TOTALENERGIES ONETECH, Courbevoie (FR)

( * ) Notice: Subject to any disclaimer, the term of this patent is extended or adjusted under 35 U.S.C. 154(b) by 0 days.

This patent is subject to a terminal disclaimer.

(21) Appl. No.: 18/699,161

(22) PCT Filed: Oct. 6, 2022

(86) PCT No.: PCT/EP2022/077850
§ 371 (c)(1),
(2) Date: Apr. 5, 2024

(87) PCT Pub. No.: WO2023/057590
PCT Pub. Date: Apr. 13, 2023

(65) Prior Publication Data
US 2024/0400928 A1    Dec. 5, 2024

(30) Foreign Application Priority Data
Oct. 7, 2021   (FR) .................. 2110620

(51) Int. Cl.
*C10M 139/00*   (2006.01)
*C07F 5/04*   (2006.01)
(Continued)

(52) U.S. Cl.
CPC ............. *C10M 139/00* (2013.01); *C07F 5/04* (2013.01); *C10M 159/12* (2013.01);
(Continued)

(58) Field of Classification Search
CPC ............. C10M 139/00; C10M 159/12; C10M 2227/062; C10M 2203/1025;
(Continued)

(56) References Cited

U.S. PATENT DOCUMENTS 2,763,613 A    9/1956   Scott et al.
2,898,359 A    8/1959   Leedham et al.
(Continued)

FOREIGN PATENT DOCUMENTS

EP    0992571 A1    4/2000
EP    2290043 A1    3/2011
(Continued)

OTHER PUBLICATIONS

3. Facile synthesis of photoluminescent inorganic-organic hydride carbon dots codoped with B and N in Dalton Transactions (Year: 2017).*
(Continued)

*Primary Examiner* — Prem C Singh
*Assistant Examiner* — Francis C Campanell
(74) *Attorney, Agent, or Firm* — The Marbury Law Group, PLLC

(57) ABSTRACT

The present patent application relates to the use, as detergent additive in a lubricating composition intended for a motorization system, of a spiro compound of formula (I)
(Continued)

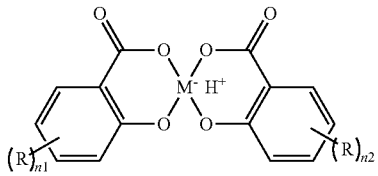

(I)

in which M is an atom selected from boron and aluminum;
R, independently of one
another, represent a hydrocarbon group comprising from 1 to 50 carbon atoms; and n1 and
n2, independently of one another, equal 0, 1 or 2.

It also relates to a lubricating composition intended for the lubrication of a motorization system, comprising one or more base oils and at least one spiro compound of formula (I), and to a process for lubricating a motorization system using such a composition.

18 Claims, 3 Drawing Sheets

(51) Int. Cl.
  *C10M 159/12* (2006.01)
  *C10N 30/04* (2006.01)
  *C10N 40/25* (2006.01)
(52) U.S. Cl.
  CPC ... *C10M 2227/062* (2013.01); *C10N 2030/04* (2013.01); *C10N 2040/25* (2013.01)
(58) Field of Classification Search
  CPC ........ C10M 2215/28; C10M 2223/045; C10M 2227/06; C10M 2227/061; C07F 5/04; C10N 2030/04; C10N 2040/25; C10N 2030/08; C10N 2030/45; C10N 2030/76; C07C 65/05
  USPC .................................................. 508/200, 194
  See application file for complete search history.

(56) References Cited

U.S. PATENT DOCUMENTS

| | | | |
|---|---|---|---|
| 3,346,496 | A | 10/1967 | Neumann et al. |
| 5,614,483 | A | 3/1997 | Fessenbecker et al. |
| 2006/0019838 | A1 | 1/2006 | Muir |
| 2006/0122077 | A1 | 6/2006 | Wilburn |
| 2014/0011720 | A1* | 1/2014 | Antzutkin ............ C10M 105/78 508/198 |
| 2014/0035768 | A1 | 2/2014 | Hu et al. |
| 2017/0015933 | A1 | 1/2017 | Fletcher et al. |
| 2017/0292083 | A1 | 10/2017 | Diegelmann et al. |
| 2018/0251700 | A1 | 9/2018 | Hartley et al. |
| 2019/0292473 | A1 | 9/2019 | Cherpeck et al. |

FOREIGN PATENT DOCUMENTS

| | | |
|---|---|---|
| JP | S6410261 A | 1/1989 |
| WO | 00/22074 A1 | 4/2000 |
| WO | 2004/101717 A2 | 11/2004 |
| WO | 2006/019838 A1 | 2/2006 |
| WO | 2006/022934 A2 | 3/2006 |
| WO | 2016/196099 A1 | 12/2016 |
| WO | 2017/148816 A1 | 9/2017 |
| WO | 2018/220007 A1 | 12/2018 |
| WO | 2018/220009 A1 | 12/2018 |
| WO | 2019/229173 A1 | 12/2019 |
| WO | 2020/094796 A1 | 5/2020 |
| WO | 2020/094800 A1 | 5/2020 |
| WO | 2020/216655 A1 | 10/2020 |
| WO | 2021/089671 A1 | 5/2021 |
| WO | 2023/057581 A1 | 4/2023 |
| WO | 2023/057586 A1 | 4/2023 |
| WO | 2023/061899 A1 | 4/2023 |

OTHER PUBLICATIONS

International Search Report and Written Opinion for counterpart Application No. PCT/EP2022/078022, dated Feb. 6, 2023.
French Search Report for counterpart Application No. FR2110701, dated May 13, 2022.
A. Nersasian, "The Effect of Lubricating Oil Additives on the Properties of Fluorohydrocarbon Elastomers," A S L E Transactions, (1980) 23:4, 343-352, DOI: 10.1080/05698198008982978.
International Search Report and Written Opinion for counterpart Application No. PCT/EP2022/077850, dated Jan. 19, 2023.
French Search Report for counterpart Application No. FR2110620, dated May 22, 2022.
Kocsis et al., "The Impact of Lubricant Volatility, Viscosity and Detergent Chemistry on Low Speed Pre-Ignition Behavior," SAE Int. J. Engines, 10(3):pp. 1019-1035, 2017.
Ritchie et al., "Controlling Low-Speed Pre-Ignition in Modern Automatic Equipment, Part 3: Identification of Key Additive Component Types of Other Lubricating Composition Effects on Low-Speed Pre-Ignition," SAE Int. J. Engines, 9(2): 832-840, 2016.
French Search Report for counterpart Application No. FR2110616, dated May 22, 2022.
International Search Report and Written Opinion for counterpart Application No. PCT/EP2022/077844, dated Jan. 19, 2023.
International Search Report and Written Opinion for counterpart Application No. PCT/EP2022/077832, dated Jan. 19, 2023.
French Search Report for counterpart Application No. FR2110617, dated May 23, 2022.

* cited by examiner

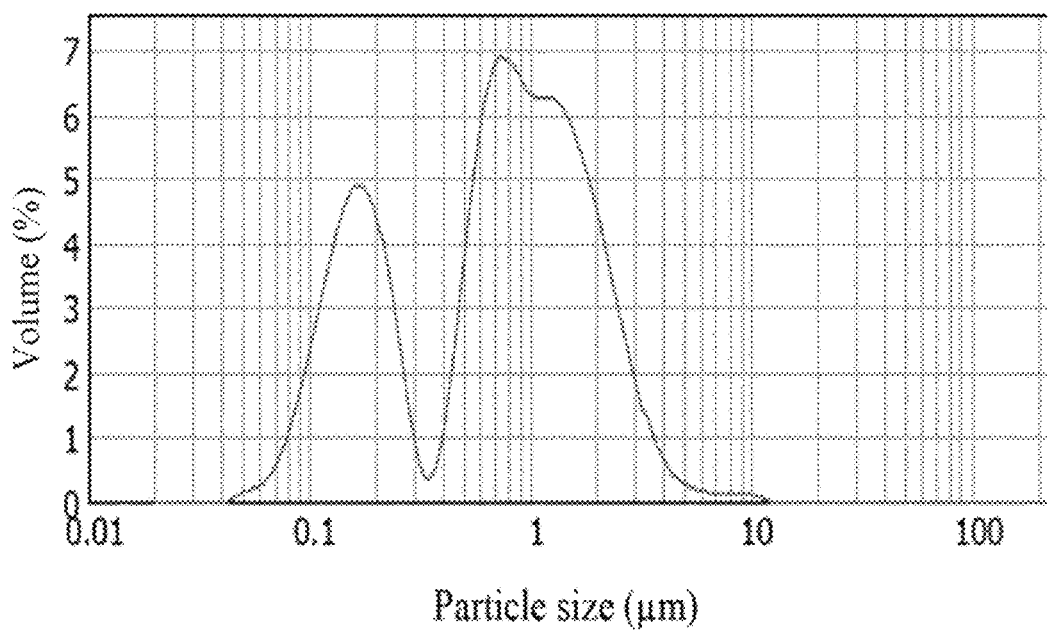
Figure 2a
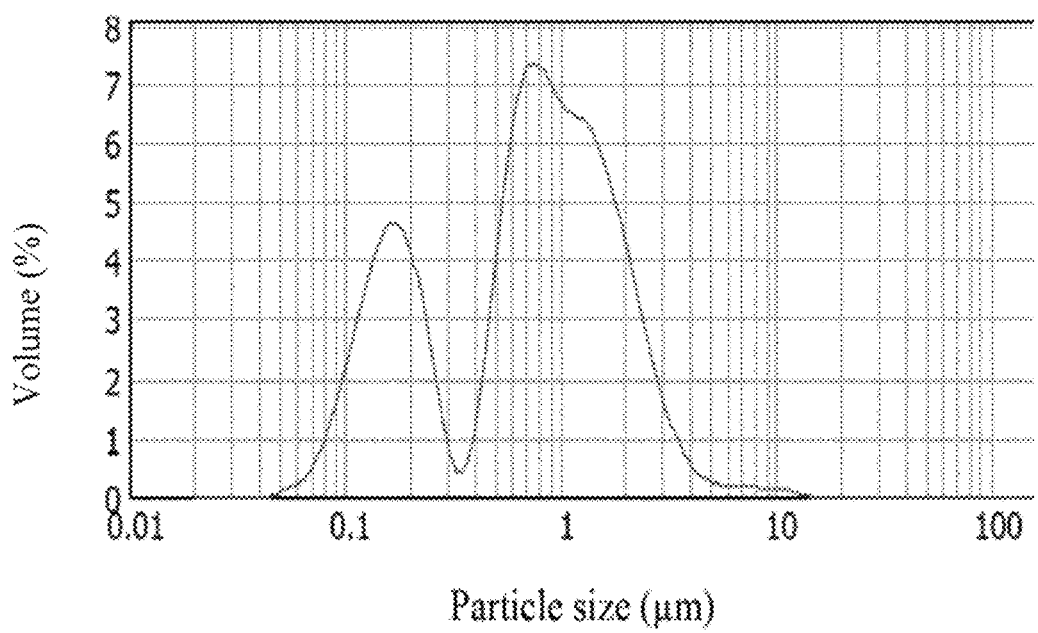
Figure 2b
FIGURE 2

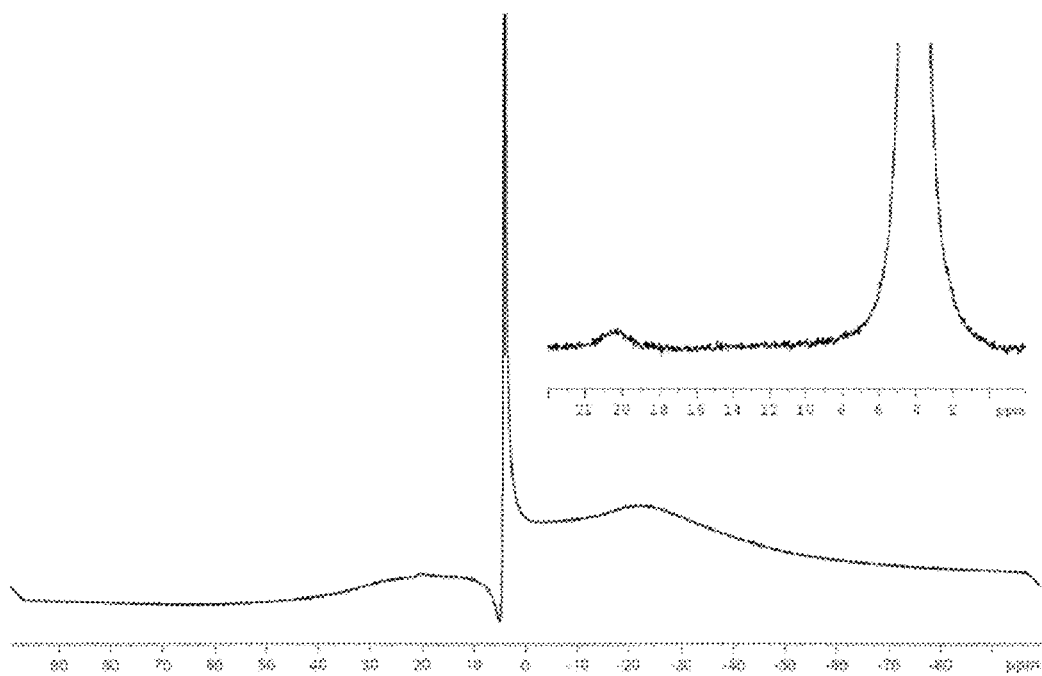
Figure 3a
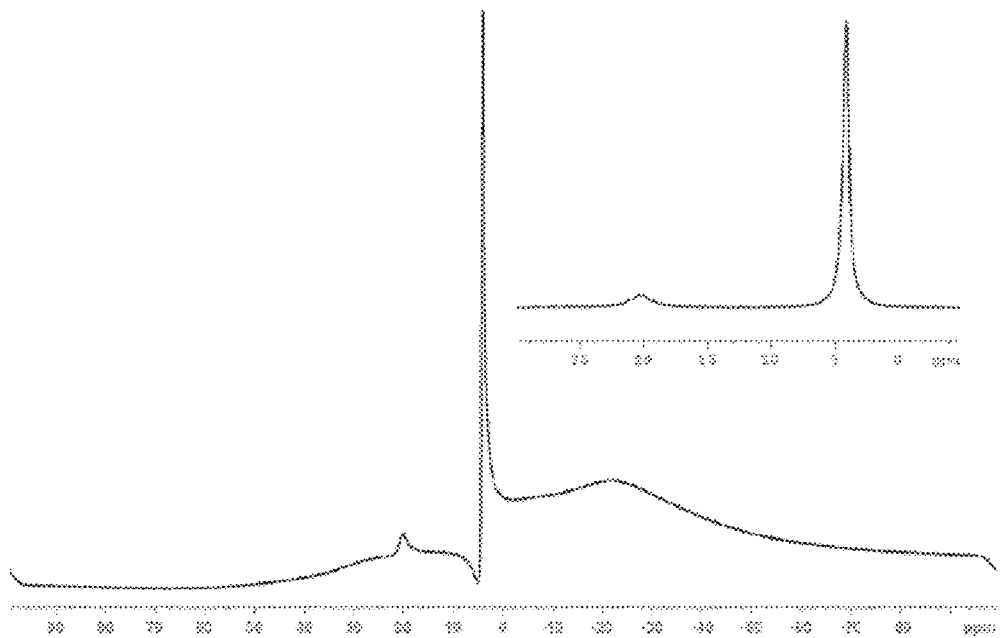
Figure 3b
FIGURE 3

SPIRO COMPOUND AS DETERGENT ADDITIVE IN LUBRICANTS FOR MOTORIZATION SYSTEMS

CROSS REFERENCE TO RELATED APPLICATIONS

This is a National Stage Application of PCT/EP2022/077850, filed internationally on Oct. 6, 2022, which claims priority to French Application No. 2110620, filed on Oct. 7, 2021, which are incorporated by reference herein in their entireties.

FIELD OF THE INVENTION

The present invention relates to the field of lubricating compositions, in particular lubricating compositions for the lubrication of systems of mobile or stationary motorization type, in particular gasoline, diesel, gas (hydrogen, compressed or liquefied natural) or dual fuel engines, in particular of light and heavy-duty motor vehicles.

It relates more particularly to the use of specific spiro compounds as detergent additives in lubricating compositions intended for the lubrication of these motorization systems. Advantageously, the invention makes it possible to achieve a lubricant having a diminished content of metallic detergents conventionally used in the field of lubricants and consequently exhibiting a reduced ash content, in particular a reduced sulfated ash content, while maintaining good detergent properties.

PRIOR ART

Lubricating compositions, also known as "lubricants", are commonly used in engines with the main purposes of reducing the frictional forces between the various moving metal parts in the engines. In addition, they are effective in preventing premature wear of, indeed even damage to, these parts and in particular their surface.

To do this, a lubricating composition is conventionally composed of a base oil with which are generally combined several additives, such as, for example, friction-modifying additives, concerned with stimulating the lubricating performances of the base oil but also with providing additional performances.

In fact, the lubricants intended for the lubrication of engines, for example diesel engines, have to satisfy several requirements. They thus have to combine good antiwear and corrosion-inhibiting performances and also good detergent and dispersion properties in order to reduce the formation of deposit.

In particular, it is essential for the lubricants, in particular for gasoline, diesel, gas (hydrogen, compressed or liquefied natural) or dual fuel engines, to have good detergent properties. In fact, the incomplete combustion of the fuel produces soot which may result in deposits of sludges, and also deposits of carbon and of varnish. In the case of diesel oil or gasoline fuels, the residual sulfur in the fuel is incinerated in the combustion chamber to produce sulfur-derived acids. These acids are responsible for the corrosion and the wear in the engine and accelerate the decomposition of the oil.

Detergent additives are thus added to the base oils to prevent the formation of deposits at the surface of the metal parts, which deposits are harmful to the engine, by dissolution of the oxidation and combustion byproducts, and to thus increase the lifetime of the engine. The detergent additives commonly used are metal salts, in particular sulfonates, phenates or salicylates of alkali metals, in particular of calcium or magnesium, which are or are not overbased.

However, these metallic detergents are ash generators.

It is known that ash, in particular sulfated ash, and also phosphorus and sulfur, may damage the systems for the post-treatment of exhaust gases which from now on equip all new vehicles in order to remove harmful emissions, such as NOx, CO and soot.

In point of fact, the existing and proposed regulations on environmental emissions require manufacturers to develop systems for the post-treatment of exhaust gases of increasing efficiency. Diesel particulate filters (DPFs), for example, which capture the particles (PM, for "Particle Matter") from the exhaust stream, make it possible to reduce the emissions of exhaust particles from diesel vehicles with an efficiency of filtration of the soot of greater than 95%.

However, when the non-incinerated particle matter, mainly due to the sulfated ash (in particular based on calcium, magnesium and zinc), phosphorus and sulfur (SAPS), are captured by the filter, the loss of head of the DPF increases because the metal deposits reduce the porosity of the filter, reducing its permeability and increasing the resistance to the flow of the exhaust gases.

Due to these negative effects on systems for the post-treatment of exhaust gases, several components manufacturers have published guidelines relating to the physical and chemical composition of lubricants for engines, including specifications in terms of "low ash content" (low SAPS).

Due to the ever stricter regulations regarding emissions harmful to the environment, the use of the metallic detergents conventionally used in lubricants might be even further restricted in the coming years.

Unfortunately, a simple reduction in the metallic detergent content is carried out to the detriment of the detergent properties of the lubricant and therefore has a deleterious effect on the lifetime of the engine.

As a consequence, research has been oriented towards the development of novel detergent compounds with low ash content.

The applications WO2018/220007 and WO2018/220009 provide for the use of compounds derived from salicylic acid, products of the reaction between salicylic acid, a boron compound and an amino compound, for example of polyamine type, for formulating lubricating compositions, combining good corrosion-resistance and wear-resistance properties and good detergent performances.

The application WO2006/022934 describes a lubricating composition comprising a lubricating oil and a detergent/antioxidizing additive produced from the reaction between an acidic organic compound and a boron compound.

DISCLOSURE OF THE INVENTION

The aim of the present invention is to provide a means for improving the detergent properties of the lubricants, intended for mobile or stationary motorization systems, in particular in light and heavy-duty vehicles, while reducing the ash content.

More particularly, in accordance with a first of its aspects, the invention concerns the use, as detergent additive in a lubricating composition intended for a motorization system, of at least one spiro compound with the following formula (I):

[Chem 1]

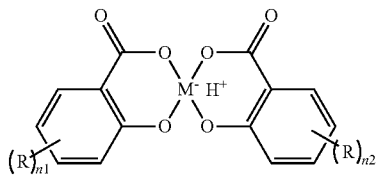

(I)

in which:

M is an atom selected from boron (B) and aluminum (Al), in particular a boron atom;

n1 and n2, independently of one another, equal 0, 1 or 2; and

R, independently of one another, represents a hydrocarbon group comprising from 1 to 50 carbon atoms, in particular from 5 to 20 and more particularly from 5 to 15 carbon atoms. Preferably, the spiro compound used in accordance with the invention has the formula (I) cited above, in which M is a boron atom. In other words, in accordance with this particular embodiment, the spiro compound is a compound known as a "spiroboronate compound", with the following formula (I'):

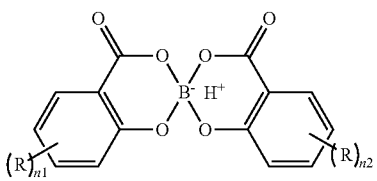

(I')

in which n1, n2 and R are as defined above.

The term "detergent additive" is understood to denote, within the meaning of the present invention, a compound which, introduced in a lubricant, makes it possible to provide and/or increase its detergent capacities and thus to reduce, to prevent, indeed even to eliminate, deposits in the motorization system.

More simply, in the remainder of the text, the term "spiro compound" in accordance with the invention will be used to designate a spiro compound with formula (I) as defined above, in particular a spiroboronate compound with formula (I') as defined above. Examples of spiro compounds under consideration according to the invention are described in more detail in the text below.

In accordance with another of its aspects, the invention further concerns a lubricating composition intended for the lubrication of a motorization system, in particular of a light or heavy-duty motor vehicle, comprising at least:

one or more base oils; and at least one spiro compound as defined above and detailed in the text below, in particular at least one spiroboronate compound with formula (I').

In accordance with a particular embodiment, in addition to said spiro compound or spiro compounds in accordance with the invention, a lubricating composition in accordance with the invention comprises one or more other detergent additives, in particular selected from the metallic detergent additives conventionally used in the field of lubricants, in particular based on calcium or magnesium.

As illustrated in the examples below, the inventors have discovered that, by supplementing a lubricant with a spiro compound as defined above, even in a low quantity, it is possible to significantly increase the detergent properties of the lubricant.

The detergent properties of the lubricant can be appreciated by evaluating the performances of the lubricant in terms of thermal stability using a "MCT" ("Micro Coking Test") test in accordance with the standard GFC Lu-27-T-07, as described in the examples. This test reveals the tendency of the lubricant to form deposits/varnish under high temperature conditions similar to those encountered in the hottest parts of the engine (from 230° C. to 280° C.).

Furthermore, as illustrated in example 2, the thermal stability of the detergent following the MCT test, enhanced by the addition of the spiro compound according to the invention, remains high even in the event of prolonged exposure of the lubricant to high temperatures. Thus, advantageously, a lubricating composition according to the invention supplemented by a spiro compound as defined above, retains good detergent capacities, even after prolonged use, in other words even when it is spent.

The term "spent", within the meaning of the invention, is understood to denote a lubricating composition used during at least one oil change interval, that is to say over a distance traveled by the vehicle of between 10 000 and 30 000 km, preferably between 15 000 and 30 000 km.

Moreover, said spiro compound or spiro compounds, used as detergent additives according to the invention, generate little in the way of ash, in comparison with conventional metallic detergents.

Consequently, the use of one or more spiro compounds advantageously makes it possible to increase the detergent capacities of a lubricating composition, without negatively impacting the content of ash generated by the lubricant.

Also, the addition of one or more spiro compounds according to the invention, capable of significantly increasing the detergent capacities of the lubricant, makes it possible to reduce the content of metallic detergents conventionally used in lubricants, for example based on calcium or on magnesium, and undesirable due to the ash which they generate, while maintaining, indeed while improving, the detergent capacity of the lubricant, in comparison with a lubricant devoid of spiro compound.

Advantageously, it is thus possible to reduce the harmful effects in terms of ash content, in particular sulfated ash content, related to the use of conventional metallic detergents, without, however, impacting the detergent properties of the lubricant, indeed even while improving the detergency.

A lubricating composition in accordance with the invention thus makes it possible to combine excellent detergent properties and a low ash content, in particular sulfated ash content. In addition, a lubricating composition in accordance with the invention advantageously has good properties in terms of reducing the fuel consumption of motor vehicles, also known as the "Fuel Eco" properties, and for this reason, contributes to the reduction in $CO_2$ emissions.

In addition, advantageously, as illustrated in the examples, the use of a spiro compound in accordance with the invention, in particular of the spiroboronate type, can also be used to significantly increase the oxidation stability of the lubricating composition.

Thus, the use of a spiro compound in accordance with the invention, in particular of a spiroboronate compound in accordance with the invention, provides access to a lubricant having excellent detergent properties, a reduced ash content and excellent oxidation stability properties.

Furthermore, advantageously, as illustrated in the examples below, the spiro compounds in accordance with the invention are not hydrolysable, primarily because of the tetravalent configuration of the boron or of the aluminum atom.

In other words, the spiro compounds in accordance with the invention, in particular the spiroboronate compounds in accordance with the invention, have an excellent stability when they are brought into contact with water (which would, for example, be obtained from the combustion of fuel or from condensation). The absence of decomposition/degradation of the spiro compounds in the presence of water can in particular be used to prevent, during the use of the lubricating composition in accordance with the invention, the formation of boric acid, a product which is classified as CMR (carcinogenic, mutagenic, and reprotoxic).

The invention also relates to a process or a method for increasing the detergent capacity of a lubricating composition intended for a mobile or stationary motorization system, in particular of a lubricating composition using a reduced content of metallic detergents, comprising the addition, to said lubricating composition, of at least one spiro compound according to the invention.

The process or the method according to the invention advantageously makes it possible to increase the detergent capacity of said composition, while maintaining a low ash content.

Finally, advantageously, by reducing the content of metallic detergents, in particular of calcium-based detergents, the lubricant according to the invention makes it possible to reduce and/or prevent phenomena of abnormal combustion of the fuel, in particular preignition, especially low speed preignition (LSPI), and/or knocking in an engine lubricated by a lubricant according to the invention (Kocsis et al, "*The Impact of Lubricant Volatility, Viscosity and Detergent Chemistry on Low Speed Pre-Ignition Behavior*", SAE Int. J. Engines, 10(3):1019-1035, 2017; Ritchie et al., "*Controlling Low-Speed Pre-Ignition in Modern Automotive Equipment*, Part 3: *Identification of Key Additive Component Types and Other Lubricating composition Effects on Low-Speed Pre-Ignition*", SAE Int. J. Engines, 9(2): 832-840, 2016).

Thus, the spiro compound is advantageously used according to the invention as detergent additive in a lubricating composition for preventing and/or reducing abnormal combustion of the fuel, in particular pre-ignition, in particular LSPI, and/or knocking, in an engine lubricated by means of said lubricating composition.

The term "abnormal combustion" means any phenomenon during which all or a portion of the fuel mixture is ignited in an uncontrolled manner inside the combustion chamber of an engine, in particular a vehicle engine, especially an automotive vehicle. The term "abnormal combustion" as used in accordance with the invention more particularly means the phenomena of pre-ignition, including low speed pre-ignition (LSPI); and knocking, including super knocking or mega knocking which may follow a pre-ignition event.

The term "pre-ignition" as used in accordance with the invention is intended to include the phenomenon of low frequency vibration, producing an acoustic effect (or "rumble"). More particularly, "pre-ignition" is low speed pre-ignition (LSPI).

The lubricants considered according to the invention, advantageously exhibiting excellent detergent properties, a reduced ash content, good "Fuel Eco" properties and properties of reduction/prevention of the phenomena of abnormal combustion of the fuel, in particular LSPI, may be used for various mobile or stationary motorization systems, in particular for motorization systems comprising a diesel, gasoline, gas or dual fuel engine, in particular a diesel or gasoline engine.

The term "motorization system", within the meaning of the present invention, is intended to denote a system comprising all the mechanical parts necessary for the targeted mobile or stationary application and including at least one engine, in particular an internal combustion engine. It may be a combustion, gas, in particular hydrogen or ammonia, electric or hybrid motorization system, depending on the nature of the engine(s) included in the motorization system: combustion, gas, in particular hydrogen or ammonia, and/or electric engine.

A "mobile" motorization system is more particularly a motorization system used in vehicles, including light vehicles, heavy-duty vehicles, off-road mobile machines or also marine vehicles.

A mobile motorization system thus corresponds more particularly to the propulsion system of a vehicle.

The term "propulsion system", within the meaning of the present invention, is intended to denote a system comprising the mechanical parts necessary for the propulsion of a vehicle. The propulsion system more particularly encompasses an engine, a transmission and optionally a battery. The battery itself generally consists of an assembly of electrical accumulators, known as cells.

A "stationary" motorization system within the meaning of the invention is a motorization system including a stationary engine. It can, for example, have applications in devices for the production of electrical energy. It may in particular be a gas-operated motorization system, in particular a gas-operated stationary engine.

A "diesel engine" in the context of the invention is a combustion engine for which the fuel is diesel fuel.

According to a particular embodiment, a lubricating composition according to the invention is used in a propulsion system of a light motor vehicle or of a heavy-duty vehicle, preferably for a gasoline or diesel engine.

The lubricating compositions according to the invention are particularly suitable for gasoline and diesel motorization systems, equipped with systems for the post-treatment of the exhaust gases, such as particulate filters (DPFs).

The invention also relates, according to another of its aspects, to a process or a method for the lubrication of a mobile or stationary motorization system, in particular of a diesel, gasoline, gas or dual fuel engine, especially in a light or heavy-duty motor vehicle, comprising a stage of bringing at least one mechanical part of said system into contact with a lubricating composition as defined above.

Other characteristics, variations and advantages of using a spiro compound in accordance with the invention will become apparent from the following description and examples, given by way of non-limiting illustration of the invention.

In the remainder of the text, the expressions "comprised between . . . and . . . ", "from . . . to . . . ", and "varying from . . . to . . . " are equivalent expressions and are intended to mean that the limits are included, unless stated otherwise.

BRIEF DESCRIPTION OF THE DRAWINGS

FIG. 2 shows the particle size distribution for the emulsion of spiroboronate in water obtained after stirring using a paddle (FIG. 2a) and after Ultra-Turrax© stirring (FIG. 2b), as described in Example 4.

FIG. 3 shows the NMR spectra for pure spiroboronate (FIG. 3a) and for residue (FIG. 3b), obtained as described in Example 4.

DETAILED DESCRIPTION

Spiro Compound

Figure 1:
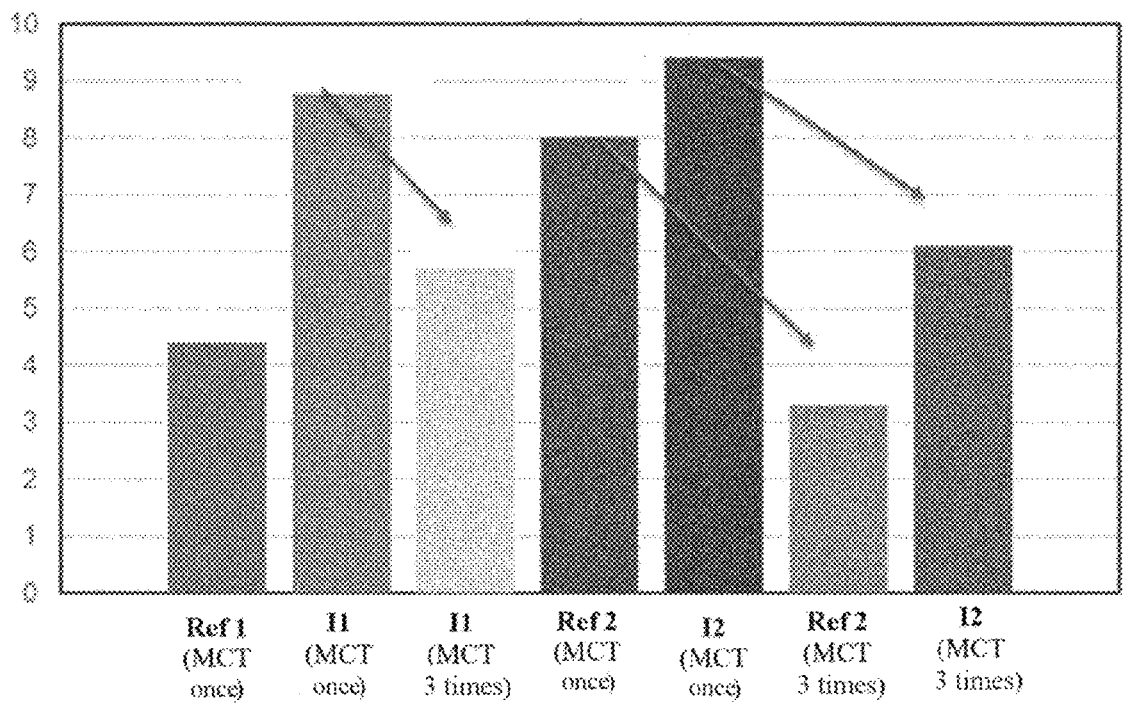
FIG. 1 shows a bar chart of the rating results according to the MCT test for the reference lubricants 1 and 2 and for the lubricating compositions according to the invention I1 and I2 supplemented with a spiro compound according to the invention, as described in examples 1 and 2.

As indicated above, the invention resides in the use, in a lubricant for a motorization system, of one or more specific spiro compounds, as additive for improving the detergency of the lubricant.

It should be understood that the invention may use a single spiro compound or a mixture of at least two distinct spiro compounds, in particular three or four distinct spiro compounds, in particular as defined below.

As mentioned above, the spiro compound under consideration according to the invention has the following formula (I):

[Chem 2]

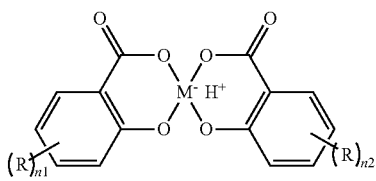
(I)

in which:
M is an atom selected from boron and aluminum, and in particular is a boron atom;
n1 and n2, independently of one another, equal 0, 1 or 2; and
R, independently of one another, represents a hydrocarbon group comprising from 1 to 50 carbon atoms, in particular from 5 to 20 and more particularly from 5 to 15 carbon atoms.

The hydrocarbon groups under consideration according to the invention may optionally be interrupted by one or more heteroatoms, for example —O—, —NH—, —N= or —S—, in particular —O— or —NH—; and/or optionally substituted by one or more —OH, —NH$_2$ and —SH groups, in particular —OH or —NH$_2$.

In accordance with a particular embodiment, the R groups are solely compounds of carbon and hydrogen atoms.

The hydrocarbon groups may in particular be alkyl, alkenyl, aryl or aralkyl groups.

In accordance with a particular embodiment, the R substituents, independently of one another, represent a hydrocarbon group, preferably an aliphatic, linear or branched chain comprising from 3 to 50 carbon atoms, in particular from 3 to 30 carbon atoms, especially from 5 to 25 carbon atoms, especially from 5 to 20 carbon atoms and more particularly from 8 to 15 carbon atoms.

In particular, the R substituents, independently of one another, may represent a linear or branched alkyl chain, in particular a $C_1$ to $C_{50}$; in particular $C_3$ to $C_{30}$, especially $C_5$ to $C_{25}$, especially $C_5$ to $C_{20}$ and more particularly $C_8$ to $C_{15}$, for example $C_{10}$ alkyl chain, preferably linear.

In accordance with a particular embodiment, n1 and n2 equal 0.

In accordance with another particular embodiment, n1 and n2 equal 1 or 2.

When n1 equals 2 or n2 equals 2, the R groups carried by the same ring may be identical or different.

In accordance with a particular embodiment, the spiro compound may have formula (I) cited above, in which n1 and n2 equal 1; the R substituents possibly being identical or different, preferably identical.

In accordance with a particular embodiment, the spiro compound has formula (I) cited above, in which:
n1 and n2 equal 1; and
the R groups, which are identical, represent $C_1$ to $C_{50}$, in particular $C_3$ to $C_{30}$, especially $C_5$ to $C_{25}$, especially $C_5$ to $C_{20}$ and more particularly $C_8$ to $C_{15}$, yet more preferably $C_{10}$, alkyl groups, preferably linear.

In accordance with a particular embodiment, the spiro compound has formula (I) in which M is a boron atom.

In other words, in accordance with this particular embodiment, the spiro compound may be a compound known as a spiroboronate, with the following formula (I'):

[Chem 3]

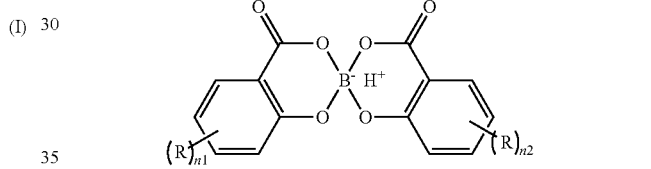
(I')

in which n1 and n2 and R are as defined above.

In accordance with another particular embodiment, the spiro compound has formula (I) in which M is an aluminum atom.

In other words, in accordance with this particular embodiment, the spiro compound may be a compound known as a spiroaluminate, with formula (I") as follows:

[Chem 4]

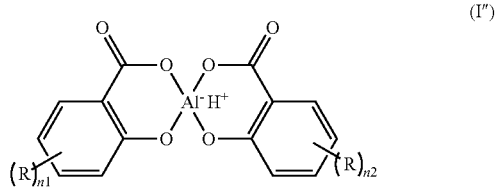
(I")

in which n1, n2 and R are as defined above.

In accordance with another of its aspects, the invention therefore concerns a spiro compound with formula (I) cited above, in which:
M is an aluminum atom;
n1 and n2, independently of one another, equal 0, 1 or 2, at least one of n1 and n2 being equal to 1 or 2; preferably, n1 and n2 are equal to 1; and
the R groups, independently of one another, represent a linear or branched aliphatic chain, in particular an alkyl chain, preferably linear, comprising from 5 to 50 carbon atoms, in particular from 6 to 30 carbon atoms, especially from 8 to 25 carbon atoms and more particularly from 10 to 15 carbon atoms.

In other words, the invention concerns a compound of the spiroaluminate type with formula (I″) cited above, in which:
n1 and n2, independently of one another, equal 0, 1 or 2, at least one of n1 and n2 being equal to 1 or 2; preferably, n1 and n2 are equal to 1; and
the R groups, independently of one another, represent a linear or branched aliphatic chain, in particular an alkyl chain, preferably linear, comprising from 5 to 50 carbon atoms, in particular from 6 to 30 carbon atoms, especially from 8 to 25 carbon atoms and more particularly from 10 to 15 carbon atoms.

In accordance with a particular embodiment, the compound of the spiroaluminate type in accordance with the invention has formula (I″) in which:
n1 and n2 equal 1; and
the R groups, which may be identical or different, preferably identical, represent alkyl chains, preferably linear, comprising from 5 to 50 carbon atoms, in particular from 6 to 30 carbon atoms, especially from 8 to 25 carbon atoms and more particularly from 10 to 15 carbon atoms.

The spiro compound used in accordance with the invention may be prepared from at least salicylic acid or a salicylic acid derivative and a boron compound or an aluminum compound.

More particularly, it may be obtained by the reaction of:
at least one compound selected from salicylic acid and its derivatives, with formula (Ia) as follows:

[Chem 5]

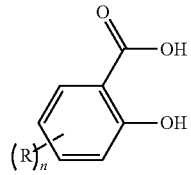

(Ia)

in which R is as defined above and n is as defined above for n1 and n2; and
at least one boron or aluminum compound, in particular boric acid or aluminum hydroxide.

The preparation of the spiro compound used in the lubricating composition in accordance with the invention does not involve any steps, subsequent to the reaction of salicylic acid or of one of its derivatives with said boron or aluminum compound, for a reaction with an amine compound, as is the case, for example, in the context of the preparation of the compounds proposed in the applications WO2018/220007 and WO2018/220009.

Salicylic acid and its derivatives with formula (Ia) cited above may be synthesized in accordance with synthesis methods which are known to the person skilled in the art or are commercially available.

The boron compound (in other words, based on boron) may in particular be selected from boric acid ($B(OH)_3$), boronic acids, boric and boronic esters, boron oxide and boric acid complexes.

In particular, the boron compound may be selected from boric acid; boron oxide; boric acid complexes; trialkyl borates, in particular in which the alkyl groups, independently of one another, comprise from 1 to 4 carbon atoms; boronic acids containing a $C_1$-$C_{12}$ alkyl group; boric acids substituted by two alkyl groups, in particular $C_1$ to $C_{12}$; boric acids substituted by two aryl groups, in particular $C_6$ to $C_{12}$; boric acids substituted by one or two aralkyl groups, in particular $C_7$ to $C_{12}$, and derivatives of these compounds obtained by substitution of at least one alkyl group by one or more alkoxy groups.

In particular, the boric acid complexes are complexes of boron with one or more molecules comprising one or more alcohol functions.

In accordance with a particular embodiment, the boron compound is boric acid.

The aluminum compound (in other words, based on aluminum) may, for example, be selected from aluminum hydroxide ($Al(OH)_3$), aluminum oxide, aluminum sulfate ($Al_2SO_4)_3$.

The person skilled in the art will be capable of adjusting the reaction conditions between the or said compounds (Ia) and the boron or aluminum compound in order to obtain the desired spiro compound.

In particular, the reaction may be carried out in a solvent medium constituted by one or more apolar solvents and/or polar protic solvents.

The solvent medium may be constituted by one or more solvents selected from naphtha, polar protic solvents such as water and alcohols, for example methanol, ethanol, propanol, butanol; and their mixtures.

Advantageously, the reaction between the salicylic acid or one of its derivatives with formula (Ia) cited above and the boron or aluminum compound in order to obtain the desired spiro compound, in particular the reaction between salicylic acid or one of its derivatives with formula (Ia) and the boron compound in order to obtain the desired spiroboronate compound, may be carried out in an apolar aprotic solvent, in particular in toluene.

In the context of the invention, the term:
"hydrocarbon group" means a radical, which may or may not be saturated, which may be linear, branched or cyclic, which may or may not be aromatic, comprising carbon and hydrogen;
"aliphatic chain" means a hydrocarbon group exclusively constituted by carbon atoms and hydrogen atoms, which may be linear or branched, saturated or unsaturated, not aromatic.
Preferably, an aliphatic chain is an alkyl chain;
"alkyl" means a saturated aliphatic group, which may be linear or branched; as an example, a $C_x$ to $C_z$ alkyl represents a saturated carbon chain containing x to z carbon atoms, which may be linear or branched;
"alkenyl" means a monounsaturated or polyunsaturated aliphatic group, which may be linear or branched;
"cycloalkyl" means a cyclic alkyl group, for example, a $C_x$ to $C_z$ cycloalkyl represents a cyclic carbon-containing group containing x to z carbon atoms, for example a cyclopropyl, cyclobutyl, cyclopentyl, cyclohexyl, cycloheptyl group;
"aryl" means a monocyclic or polycyclic aromatic group, in particular comprising between 6 and 10 carbon atoms. An example of an aryl group that may be cited is a phenyl or naphthyl group;
"aralkyl" means an aryl group as defined above, substituted by at least one alkyl group as defined above.

Said spiro compound or spiro compounds are advantageously used in a content that is sufficient to reach the required level for the detergent capacity of the lubricant. Advantageously, even a small quantity of spiro compound (s), in particular less than 2% by weight, especially less than or equal to 1% by weight, with respect to the total weight of said lubricating composition, makes it possible to significantly increase the detergent capacity of the lubricant.

Clearly, the quantity of spiro compound(s) used may be adjusted as a function of the nature of the lubricant, and more particularly taking into account the presence or otherwise and the quantity of other detergent additive(s) used which are present in the lubricant, in particular metallic detergents, for example based on calcium.

In general, said spiro compound or spiro compounds under consideration according to the invention, in particular as defined above, may be used in an amount of 0.1 to 20% by weight, in particular 0.2 to 15% by weight, especially 0.5 to 10%, and more particularly 0.5 to 5.0% by weight, with respect to the total weight of said lubricating composition.

Lubricating Composition

A lubricating composition such as that under consideration according to the invention comprises more particularly one or more base oils and, optionally, other additives considered conventional in the lubricating compositions.

It should be understood that the nature and the quantity of the other additives are adapted to the destination of the lubricant, and more particularly in respect of the type of motorization system for which it is intended, for example according to whether it is intended for a use for an engine of a light vehicle, of a heavy-duty vehicle, diesel or gasoline engine, etc.

Base Oil

Conventionally, a lubricating composition comprises one or more base oils.

These base oils may be selected from base oils in conventional use in the field of lubricating oils, such as mineral oils, synthetic oils or natural, animal or vegetable oils, or their blends. It may be a blend of several base oils, for example a blend of two, three or four base oils. The base oils of the lubricating compositions under consideration according to the invention may in particular be oils of mineral or synthetic origins belonging to groups I to V in accordance with the classes defined in the API (or their equivalents in accordance with the ATIEL classification) and shown in Table A below, or their blends.

TABLE 1

Table A

| | Saturates content | Sulfur content | Viscosity index (VI) |
|---|---|---|---|
| Group I Mineral oils | <90% | >0.03% | 80 ≤ VI < 120 |
| Group II Hydrocracked oils | ≥90% | ≤0.03% | 80 ≤ VI < 120 |
| Group III Hydrocracked or hydroisomerized oils | ≥90% | ≤0.03% | ≥120 |
| Group IV | Polyalphaolefins (PAO) | | |
| Group V | Esters and other bases not included in groups I to IV | | |

Mineral base oils include all types of base oils obtained by atmospheric and vacuum distillation of crude oil, followed by refining operations such as solvent extraction, deasphalting, solvent dewaxing, hydrotreatment, hydrocracking, hydroisomerization and hydrofinishing.

The synthetic base oils may be esters of carboxylic acids and alcohols, polyalphaolefins or in fact polyalkylene glycols (PAG) obtained by polymerization or copolymerization of alkylene oxides comprising 2 to 8 carbon atoms, in particular 2 to 4 carbon atoms. The polyalphaolefins used as base oils are, for example, obtained from monomers comprising 4 to 32 carbon atoms, for example from decene, octene or dodecene, and for which the viscosity at 100° C. is comprised between 1.5 and 15 mm$^2 \cdot$s$^{-1}$ in accordance with the standard ASTM D445. Their molecular weight average is generally comprised between 250 and 3000 in accordance with the standard ASTM D5296.

Blends of synthetic and mineral oils, which may have been biosourced, may also be used. There is generally no limitation as to the use of different base oils in the lubricating composition, except that it must have properties, in particular those of viscosity, viscosity index, sulfur content or oxidation resistance, which are adapted to a use for motorization systems, in particular for vehicle engines.

Preferably, a lubricating composition under consideration according to the invention comprises at least one base oil selected from oils from group II, III and IV of the API classification, and their blends.

In particular, such a lubricating composition may comprise at least one base oil from group III, in particular a blend of at least two base oils from group III.

The base oils which are suitable for the invention may have a kinematic viscosity, measured at 40° C. in accordance with the standard ASTM D445 (KV40), of 10 to 100 mm$^2$/s, in particular of 12 to 50 mm$^2$/s, more particularly of 15 to 40 mm$^2$/s.

Suitable base oils for the invention may have a kinematic viscosity, measured at 100° C. in accordance with the standard ASTM D445 (KV100), of 1 to 15 mm$^2$/s, in particular of 2 to 10 mm$^2$/s, more particularly of 4 to 8 mm$^2$/s.

The base oil or base oils may be present in a lubricating composition in accordance with the invention in a content of at least 50% by weight, with respect to its total mass, in particular of at least 60% by weight, more particularly of 60 to 99% by weight and preferably of 70% to 90% by weight.

Preferably, the group III oil or oils represent(s) at least 50% by weight, in particular at least 60% by weight, more particularly between 70 and 100% by weight, for example between 80 and 100% by weight, of the total mass of the base oils of the composition.

Additives

A lubricating composition in accordance with the invention may comprise any type of additive which is adapted to the envisaged use of the lubricant, as detailed in the text below, for example for a use in motorization systems of light or heavy-duty vehicles, in particular diesel engines.

In particular, in the case where it is sought to formulate a lubricant having a low ash content, it is understood that the additives are chosen so as not to significantly impact the ash content of the lubricating composition.

These additives may be introduced in isolation and/or in the form of a mixture, or "additive package", in the same manner as those which are already on sale for commercial lubricant formulations for vehicle engines, with a performance level as defined by the ACEA (European Automobile Manufacturers Association) and/or the API (American Petroleum Institute), which are well known to the person skilled in the art.

These additives, which are distinct from said spiro compound or spiro compounds, may in particular be selected from other detergent additives, which are distinct from said spiro compound or spiro compounds, in particular metallic detergent additives, friction modifiers, anti-wear additives, extreme pressure additives, antioxidants, viscosity index improvers (VI), pour point depressant additives (PPD), dispersing agents, anti-foaming agents, thickening agents, corrosion inhibitors, and their mixtures.

Advantageously, a lubricating composition in accordance with the invention comprises one or more additives selected from other detergent additives, which are distinct from said spiro compound or spiro compounds, in particular selected from metallic detergent additives, viscosity index improvers, pour point depressant additives, anti-wear additives, antioxidants and their mixtures.

Other Detergents

The lubricating composition under consideration according to the invention, supplemented with one or more spiro compounds according to the invention, in particular as defined above, may comprise one or more other detergent additives, in particular one or more metallic detergent additives.

As discussed above, metallic detergents are known to the person skilled in the art for providing high levels of detergency. However, these metallic compounds suffer from the disadvantage of being generators of sulfated ash.

They are generally anionic compounds comprising a long lipophilic hydrocarbon chain and a hydrophilic head, the associated cation possibly being a metallic cation of an alkali or alkaline earth metal.

They are generally selected from alkali metal or alkaline earth metal salts of carboxylic acids, in particular sulfonates, salicylates, naphthenates, phenates, carboxylates and mixtures thereof. The alkali and alkaline earth metals are preferably calcium, magnesium, sodium or barium.

These metallic salts generally comprise the metal in stoichiometric quantities or in fact in excess, i.e., in a quantity which is above the stoichiometric quantity. They are therefore overbased detergent additives; the excess metal providing the overbased character of the detergent additive is thus generally in the form of a metallic salt that is insoluble in the base oil, for example a carbonate, a hydroxide, an oxalate, an acetate, a glutamate, preferably a carbonate.

In accordance with a particular embodiment, a lubricating composition in accordance with the invention comprises at least one metallic detergent additive that is distinct from the spiro compounds in accordance with the invention, in particular selected from the salts of alkali metals or alkaline earth metals, which may or may not be overbased, in particular from calcium salts, magnesium salts and their mixtures.

Thus, in accordance with a particular embodiment, a lubricating composition in accordance with the invention, intended for a motorization system, in particular for a light or heavy-duty motor vehicle, comprises at least:
one or more base oils;
at least one spiro compound in accordance with the invention; and
at least one metallic detergent additive that is distinct from said spiro compound, in particular as defined above, especially selected from calcium salts and magnesium salts and their mixtures.

In particular, a lubricating composition in accordance with the invention may comprise at least one detergent additive based on calcium, such as a sulfonate, a salicylate, a naphthenate, a phenate, a calcium carboxylate or a mixture thereof, in particular a detergent additive based on overbased calcium, for example with calcium carbonate.

Advantageously, as indicated above, given the addition of one or more spiro compounds in accordance with the invention, making it possible to significantly increase the detergent capacity of the lubricant, the content of metallic detergent additives as defined above, which are undesirable in respect of the ash that they produce, may be decreased, while preserving good detergent properties.

In accordance with a particular embodiment, the lubricating composition in accordance with the invention may comprise less than 15% by weight, in particular less than 10% by weight and more particularly 0.1 to 10% by weight, in particular 0.5% to 5.0% by weight, of metallic detergent additive(s) which are distinct from the spiro compounds in accordance with the invention, with respect to the total weight of said composition.

In particular, the or said metallic detergent additives may be present in the lubricating composition in a manner such as to provide a metallic element(s) content, in particular of calcium, of less than or equal to 6000 ppm, in particular from 100 ppm to 4000 ppm, preferably from 250 ppm to 3000 ppm.

The reduction in the metallic detergents content, such as the calcium and magnesium salts, can advantageously enable "LOW SAPS" specifications for lubricating compositions to be met.

Advantageously, a lubricating composition in accordance with the invention therefore has a sulfated ash content, determined in accordance with the standard ASTM D-874, of less than or equal to 2% by weight, in particular less than or equal to 1.5% by weight, and more particularly less than or equal to 1% by weight, with respect to the total weight of said lubricating composition.

In accordance with a particular embodiment, a lubricating composition in accordance with the invention may comprise:
from 60 to 99.8% by weight, preferably from 70 to 90% by weight, of one or more base oils;
from 0.1 to 20% by weight, in particular from 0.2 to 15% by weight and more particularly from 0.5 to 10% by weight of at least one spiro compound in accordance with the invention, as defined above, in particular at least one spiroboronate compound in accordance with the invention; and
from 0.1 to 10% by weight, in particular from 0.5 to 5% by weight, of one or more metallic detergent additives, distinct from said spiro compound in accordance with the invention, in particular as defined above, especially selected from calcium and magnesium salts and their mixtures;
the contents being expressed with respect to the total weight of said lubricating composition.

Other Additives

A lubricating composition under consideration in accordance with the invention may also comprise one or more other additives, which are distinct from said spiro compound or spiro compounds, selected from friction modifiers, anti-wear additives, extreme pressure additives, antioxidants, viscosity index improvers, pour point depressant additives, dispersing agents, anti-foaming agents, thickening agents, corrosion inhibitors, and their mixtures.

Thus, a lubricating composition under consideration in accordance with the invention may also comprise at least one viscosity index improver (VI). Viscosity index improvers (VI), in particular viscosity index-improving polymers, can guarantee good cold performances and a minimum viscosity at high temperatures. Examples of viscosity index-improving polymers that may be cited are polymeric styrene, butadiene and isoprene esters, homopolymers or copolymers which may be hydrogenated or non-hydrogenated, homopolymers or copolymers of olefins such as ethylene or propylene, polyacrylates and polymethacrylates (PMA).

Advantageously, a lubricating composition in accordance with the invention comprises at least one viscosity index improver selected from polymethacrylates (PMA) and linear, graft, comb or star, preferably star, hydrogenated polyisoprene-styrene (PISH).

In particular, the viscosity index-improving additive(s) may be present in a lubricating composition in accordance with the invention in a content of 1 to 15% by weight, in particular of 2 to 10% by weight, with respect to the total weight of the lubricating composition.

In accordance with one embodiment, a lubricating composition in accordance with the invention is free from a viscosity index-improving additive.

A lubricating composition under consideration according to the invention may comprise at least one friction modifier.

Friction modifiers may be selected from compounds providing metallic elements and ash-free compounds, preferably from ash-free compounds.

Compounds which provide metallic elements that may be cited are complexes of transition metals such as Mo, Sb, Sn, Fe, Cu, Zn the ligands of which may be hydrocarbon compounds comprising oxygen, nitrogen, sulfur or phosphorus atoms.

Advantageously, the friction modifiers are selected from ash-free compounds, generally of organic origin and possibly more particularly being selected from monoesters of fatty acids and polyols, alkoxylated amines, alkoxylated fatty amines, fatty epoxides, fatty borate epoxides, fatty amines or fatty acid glycerol esters. In accordance with the invention, the fatty compounds comprise at least one hydrocarbon group comprising from 10 to 24 carbon atoms.

In accordance with an advantageous variation, a lubricating composition comprises at least one friction modifier, in particular based on molybdenum.

In particular, the compounds based on molybdenum may be selected from molybdenum dithiocarbamates (Mo-DTC), molybdenum dithiophosphates (Mo-DTP), and their mixtures. Advantageously, a lubricating composition under consideration according to the invention may comprise from 0.01 to 5% by weight, preferably from 0.01 to 5% by weight, more particularly from 0.1 to 2% by weight or yet more particularly from 0.1 to 1.5% by weight, with respect to the total weight of the lubricating composition, of friction modifiers.

A lubricating composition in accordance with the invention may comprise at least one anti-wear and/or extreme pressure additive.

Anti-wear additives and extreme pressure additives protect friction surfaces by forming a protective film adsorbed onto these surfaces.

A wide variety of anti-wear additives exists. Preferably, for the lubricating composition in accordance with the invention, anti-wear additives are selected from phosphosulfur additives such as metallic alkylthiophosphates, in particular zinc alkylthiophosphates, and more specifically zinc dialkyldithiophosphates or ZnDTP. Preferred compounds have formula $Zn((SP(S)(OR^3)(OR^4))_2$, in which $R^3$ and $R^4$, which may be identical or different, independently represent an alkyl group, preferably an alkyl group comprising from 1 to 18 carbon atoms.

Amine phosphates are also anti-wear additives which may be used in the lubricating composition in accordance with the invention. However, the phosphorus provided by these additives could act as a poison on the catalytic systems of automobiles, because these additives generate ash. These effects may be minimized by partially substituting the amine phosphates by additives which do not provide phosphorus, such as polysulfides, for example, in particular sulfur-containing olefins. Advantageously, the extreme pressure and/or anti-wear additive or additives may be present in a lubricating composition in accordance with the invention in a content from 0.01 to 6% by weight, preferably from 0.05 to 4% by weight, more preferably from 0.1 to 2% by weight with respect to the total weight of lubricating composition.

A lubricating composition under consideration according to the invention may comprise at least one antioxidant additive. Antioxidant additives are essentially dedicated to retarding the degradation of the lubricating composition when in service. This degradation may in particular result in the formation of deposits, in the presence of sludge or in an increase in the viscosity of the lubricating composition. In particular, they act as radical inhibitors or hydroperoxide destroyers.

Antioxidant additives in current use that may be cited include antioxidant additives of the phenolic type, antioxidant additives of the amine type, phosphosulfur-containing antioxidant additives. Certain of these antioxidant additives, for example phosphosulfur-containing antioxidant additives, may be ash generators. Phenolic antioxidant additives may be free from ash, or in fact be in the form of neutral or basic metallic salts. The antioxidant additives may in particular be selected from sterically hindered phenols, sterically hindered phenol esters and sterically hindered phenols comprising a thioether bridge, diphenylamines, diphenylamines substituted by at least one $C_1$-$C_{12}$ alkyl group, N,N'-dialkylaryl diamines, and their mixtures.

Preferably, the sterically hindered phenols are selected from compounds comprising a phenol group wherein at least one carbon is vicinal to the carbon carrying the alcohol function is substituted by at least one $C_1$-$C_{10}$ alkyl group, preferably a $C_1$-$C_6$ alkyl group, preferably a $C_4$ alkyl group, preferably by the tert-butyl group.

Amine compounds are another class of antioxidant additives that may be used, optionally in combination with phenolic antioxidant additives. Examples of amine compounds are aromatic amines, for example aromatic amines with formula $NR^5R^6R^7$ in which $R^5$ represents an aliphatic group or an aromatic group, optionally substituted, $R^6$ represents an aromatic group, optionally substituted, $R^7$ represents a hydrogen atom, an alkyl group, an aryl group or a group with formula $R^8S(O)_zR^9$ in which $R^8$ represents an alkylene group or an alkenylene group, $R^9$ represents an alkyl group, an alkenyl group or an aryl group, and z represents 0, 1 or 2.

Sulfurized alkyl phenols or their salts of alkali metals and alkaline earth metals may also be used as antioxidant additives.

A lubricating composition under consideration according to the invention may contain any type of antioxidant additive known to the person skilled in the art. Advantageously, the lubricating composition comprises at least one antioxidant additive that is free from ash. Advantageously again, a lubricating composition under consideration according to the invention may comprise 0.1 to 2% by weight, with respect to the total weight of the composition, of at least one antioxidant additive.

A lubricating composition under consideration according to the invention may comprise at least one pour point depressant additive (known as "PPD" agents). By slowing down the formation of paraffin crystals, pour point depressant additives generally improve the cold performance of the lubricating composition.

Examples of pour point depressant agents that may be cited are alkyl polymethacrylates, polyacrylates, polyarylamides, polyalkylphenols, polyalkylnaphthalenes and alkylated polystyrenes.

A lubricating composition under consideration according to the invention may also comprise at least one dispersing agent. Dispersing agents ensure that the suspension is maintained and ensure the evacuation of insoluble solid contaminants constituted by the secondary oxidation products that are formed when the lubricating composition is in service. They may be selected from Mannich bases, succinimides and their derivatives.

In particular, a lubricating composition under consideration according to the invention may comprise from 0.2 to 10% by weight of dispersing agent(s), with respect to the total weight of the composition.

A lubricating composition under consideration according to the invention may also comprise at least one anti-foaming additive. The anti-foaming additives may be selected from polar polymers such as polymethylsiloxanes or polyacrylates.

In particular, a lubricating composition under consideration according to the invention may comprise from 0.01 to 3% by weight of anti-foaming additive(s), with respect to the total weight of the lubricating composition.

As mentioned above, the ensemble of the additives detailed above may be introduced in the form of a mixture or "package" of additives.

In accordance with this embodiment, the additive package may represent from 1% to 30% by weight with respect to the total weight of the composition, in particular from 1 to 20% by weight, especially from 3% to 15% by weight and more particularly from 5 to 15% by weight.

In accordance with a particular embodiment, a lubricating composition in accordance with the invention may comprise, or even be constituted by:
- a base oil or a mixture of base oils;
- one or more spiro compounds in accordance with the invention, in particular as defined above and more particularly at least one spiroboronate compound in accordance with the invention; and
- optionally, one or more additives, which are distinct from said spiro compound or spiro compounds, selected from the other detergent additives, in particular metallic detergent additives, friction modifying agents, anti-wear additives, extreme pressure additives, antioxidants, viscosity index improvers (VI), pour point depressant additives (PPD), dispersing agents, anti-foaming agents, thickening agents, corrosion inhibitors, and their mixtures.

Preferably, a lubricating composition formulated in accordance with the invention comprises, or even is constituted by:
- from 60 to 98.9% by weight, in particular from 70 to 90% by weight, of one or more base oils;
- from 0.1 to 20% by weight, preferably from 0.5 to 10% by weight, of one or more spiro compounds in accordance with the invention, as defined above, in particular of one or more spiroboronate compounds in accordance with the invention; and
- from 1% to 30% by weight, preferably from 3% to 20% by weight, of one or more additive(s) selected from the other detergent additives, which are distinct from said spiro compound or spiro compounds, in particular selected from metallic detergent additives; anti-wear agents; antioxidants; dispersing agents; viscosity index-improving agents and their mixtures;

the contents being expressed with respect to the total weight of said lubricating composition.

In particular, a lubricating composition formulated in accordance with the invention may comprise, or even be constituted by:
- from 60 to 99.8% by weight, in particular from 70 to 90% by weight, of one or more base oils;
- from 0.1 to 20% by weight, preferably from 0.5 to 10% by weight, of one or more spiro compounds in accordance with the invention as defined above, in particular of one or more spiroboronate compounds in accordance with the invention;
- from 0.1 to 10% by weight, in particular from 0.5 to 5% by weight, of one or more metallic detergent additives, which are distinct from said spiro compound or spiro compounds, in particular as defined above, especially selected from calcium and magnesium salts and their mixtures; and
- optionally, from 1% to 30% by weight, preferably from 3% to 20% by weight, of one or more other additives selected from anti-wear agents, antioxidants, viscosity index-improving agents and their mixtures, the contents being expressed with respect to the total weight of said lubricating composition.

In accordance with a particular embodiment, a lubricating composition in accordance with the invention may have a kinematic viscosity, measured at 40° C. in accordance with the standard ASTM D445, comprised between 20 $mm^2/s$ and 50 $mm^2/s$, preferably between 25 $mm^2/s$ and 40 $mm^2/s$.

Advantageously again, a lubricating composition in accordance with the invention has a kinematic viscosity, measured at 100° C. in accordance with the standard ASTM D445, comprised between 2 $mm^2/s$ and 20 $mm^2/s$, preferably between 4 $mm^2/s$ and 15 $mm^2/s$.

Application

As indicated above, the lubricating compositions considered according to the invention may be intended for mobile or stationary motorization systems, in particular for gasoline, diesel, gas or dual fuel engines.

The invention thus relates, according to another of its aspects, to the use of a composition as defined above, incorporating one or more spiro compounds as detergent additive, for lubricating a mobile or stationary motorization system.

The lubricating compositions according to the invention may be intended in particular for motorization systems including an internal combustion engine and more particularly a diesel oil fuel or gasoline engine, preferably a diesel engine.

According to a particular embodiment, they are used for the lubrication of a motorization system of a vehicle, more particularly of a light or heavy-duty vehicle, for example trucks. In particular, they may be suitable for the lubrication of gasoline or diesel motorization systems, equipped with systems for the post-treatment of the exhaust gases, in particular with diesel particulate filters (DPFs).

The ensemble of features and particular embodiments relating to the spiro compound with formula (I) and to the lubricating composition comprising it is also applicable to the uses, processes and methods envisaged according to the invention.

The invention will now be described with the aid of the following examples, given by way of non-limiting illustration of the invention.

EXAMPLE

Thermal Stability Measurement

The performances of the compositions in terms of thermal stability were evaluated by MCT ("Micro Coking Test"), in accordance with the standard GFC Lu-27-T-07.

The MCT test evaluates the tendency of a composition to form deposits (or varnish) on a hot surface (coking). It reveals the thermal stability of a composition in a thin layer, subjected to temperature conditions similar to those encountered in the hottest parts of an engine (230 to 280° C.). The deposits and varnish are measured by a video rater. The result is expressed in the form of a rating out of 10, termed a grade, in accordance with the CEC M-02-A-78 method. The higher the value for the MCT, the better is the thermal stability of the lubricating composition.

The test conditions were as follows:

600 µL of oil;

duration: 90 minutes;

plate inclined by 1.5%;

temperature gradient from 230 to 280° C.;

video rating of varnish on the plate: rating from 0 to 10, best result 10.

Furthermore, the temperature beyond which the varnish is deposited was also determined. The higher this temperature, the better is the thermal stability of the lubricating composition.

Measurement of Stability to Oxidation

The stability to oxidation was evaluated by pressure differential scanning calorimetry, which determines the oxidation induction time, termed OIT, for the lubricating compositions. It is a standard procedure in the lubricating oil industry based on the standard CEC L-85 T-99. According to this protocol, the lubricating composition to be tested is heated to a high temperature (in the present case, isothermally at 50° C. for 5 minutes, then raised to 210° C. at 40° C./min, oxidation occurring at 210° C.), and the moment at which the lubricant starts to decompose is measured. The longer the duration of the test, expressed in minutes, the better is the stability of the lubricant to oxidation.

Example 1

Evaluation of the Detergent Properties Linked to the Addition of the Spiroboronate The effect of the addition of a spiroboronate compound has been evaluated for two lubricants, denoted reference 1 and reference 2, intended for heavy-duty vehicles, the composition of which is detailed in the table below. The lubricants were formulated simply by mixing the various components at 60° C.

TABLE 2

| | Reference 1 | Reference 2 |
| --- | --- | --- |
| Base oil 1[(1)] [%] | 65.2 | 62.7 |
| Base oil 2[(2)] [%] | 20 | 20 |
| Additive package 1[(3)] [%] | 8 | — |
| Additive package 2[(4)] [%] | — | 12.5 |
| PISH polymer [%] | 6.8 | 4.8 |

[(1)]Group III base oil (KV100 = 6.3-6.7 mm$^2$/s, KV40 = 37 mm$^2$/s, VI more than 125), commercially available from SK Lubricants, for example, under the commercial name "Yubase ® 6".
[(2)]Group III base oil (KV100 = 4.2 mm$^2$/s, KV40 = 19.1 mm$^2$/s, VI of 126), commercially available from SK Lubricants, for example, under the commercial name "Yubase ® 4".
[(3)]Package of additives that are usual in the lubricants field and commercially available. It comprises zinc dithiophosphate type anti-wear agents, calcium-based detergents and PIBSI type dispersing agents.
[(4)]Package of additives that are usual in the lubricants field and commercially available. It comprises zinc dithiophosphate type anti-wear agents, calcium-based detergents and PIBSI type dispersing agents.

Two lubricating compositions in accordance with the invention, denoted I1 and I2, are prepared by respectively supplementing the reference lubricants 1 and 2 with a spiroboronate compound in accordance with the invention (spiro compound with formula (I), in which M is a boron atom, R each representing a decyl group and $n_1$ and $n_2$ equaling 1), in an amount of 1% by weight with respect to the reference lubricant.

The properties in terms of the thermal stability of the reference lubricants 1 and 2 and of the lubricating compositions I1 and I2 in accordance with the invention, incorporating a spiroboronate compound in accordance with the invention, are evaluated in accordance with the MCT protocol described above.

The rating results (MCT at 90 min) are summarized in the table below and are presented in the bar chart of FIG. 1. The values for the temperature beyond which the formation of deposits occurs ($T_{deposit}$) are also summarized in the table below.

TABLE 3

| | Reference 1 | Reference 2 | I1 (ref 1 + 1% spiroboronate) | I2 (ref 2 + 1% spiroboronate) |
| --- | --- | --- | --- | --- |
| MCT at 90 min[(*)] | 4.4 | 8 | 8.8 | 9.4 |
| $T_{deposit}$ (° C.) | 235 | 249 | 264 | 272 |

[(*)]The values are expressed with a standard deviation of ±1%.

The compositions in accordance with the invention, supplemented with a spiroboronate compound in accordance with the invention, have an excellent rating, which is higher than those obtained with the reference lubricants, which demonstrates a significantly increased thermal stability under high temperature conditions (from 230° C. to 280° C.).

These results are confirmed by the deposit formation temperatures for the compositions in accordance with the invention, which are far better than those obtained with the reference lubricants.

Thus, the addition of a spiroboronate compound according to the invention makes it possible to significantly increase the thermal stability of the lubricant. The lubricants will thus form less in the way of deposit/varnish under the conditions of use in the motorization system of the vehicles, and thus exhibit improved detergent properties.

Example 2

Maintenance of the Detergent Properties During the Aging of the Lubricant

The reference lubricants and the lubricating compositions according to the invention, as prepared in Example 1, are evaluated according to the MCT test modified to subject the layers of lubricant to high temperature (from 230 to 280° C.) for a duration which is three times longer (3 times 90 minutes). Such conditions make it possible to simulate aging of the lubricant.

The rating results, under the different conditions of the MCT test, are summarized in the following table and are presented in the bar chart of FIG. 1. The values for the temperature beyond which the formation of deposits occurs ($T_{deposit}$) are also summarized in the following table.

TABLE 4

|  | Reference 1 | Reference 2 | I1 (ref 1 + 1% spiroboronate) | I2 (ref 2 + 1% spiroboronate) |
|---|---|---|---|---|
| MCT at 3 times 90 min(*) | ND | 3.3 | 5.7 | 6.1 |
| $T_{deposit}$ (° C.) | ND | 235 | 249 | 243 |

(*)The results are expressed with a standard deviation of ±1%

These results show that the lubricants supplemented with a spiroboronate retain an improved thermal stability, even for a duration of exposure to the high temperature conditions which is three times longer.

These results are confirmed by temperatures beyond which the formation of the deposits occurs for the compositions according to the invention, which are far better than those obtained with the reference lubricants.

Thus, the lubricants according to the invention retain excellent detergent properties even after repeated use of the lubricant.

Example 3

Evaluation of the Oxidation Stability Properties of the Lubricants

The effect of adding a spiroboronate compound on the oxidation stability properties was evaluated for two lubricants, denoted CC3 and CC4, details of the composition of which are given in Table 5 below.

Two lubricating compositions in accordance with the invention, denoted I3 and I4, were prepared on the basis of the comparative lubricants CC3 and CC4, in which 2% by weight of base oil was replaced by 2% by weight of spiroboronate compound in accordance with the invention.

The lubricants were formulated simply by mixing the various components at 60° C.

TABLE 5

|  | CC3 | I3 | CC4 | I4 |
|---|---|---|---|---|
| Base oil 1[(1)] [%] | 59.6 | 57.6 | — | — |
| Base oil 2[(2)] [%] | 20 | 20 | — | — |
| Base oil 3[(3)] [ %] | — | — | 79.2 | 77.2 |
| Additive package [(4)] [%] | 13.2 | 13.2 | 13.2 | 13.2 |

TABLE 5-continued

|  | CC3 | I3 | CC4 | I4 |
|---|---|---|---|---|
| OCP polymer [%] | 7.2 | 7.2 | 7.6 | 7.6 |
| Spiroboronate compound[(5)] [%] | 0 | 2 | — | 2 |

[(1)]Group III base oil (KV100 = 6.3-6.7 mm²/s, KV40 = 37 mm²/s, VI more than 125), commercially available from SK Lubricants, for example, under the commercial name "Yubase ® 6";

[(2)]Group III base oil (KV100 = 4.2 mm²/s, KV40 = 19.1 mm²/s, VI of 126), commercially available from SK Lubricants, for example, under the commercial name "Yubase ® 4";

[(3)]Group I base oil (KV100 = 5.0-5.5 mm²/s, KV40 = 30.0-31.54 mm²/s, VI of 90-92), commercially available from DANA, for example, under the commercial name "SN150";

[(4)] Mixture of various additives that are usual in the lubricants field and commercially available. It comprised an overbased calcium-based detergent additive and did not contain a zinc dithiophosphate type anti-wear additive;

[(5)]Spiro compound with formula (I), in which M is a boron atom, R each representing a decyl group and $n_1$ and $n_2$ equaling 1.

The oxidation stability properties were evaluated using the protocol based on the standard CEC L-85 T-99, described above.

The oxidation induction time (OIT) results are summarized in the table below.

TABLE 6

|  | Lubricant | | | |
|---|---|---|---|---|
|  | CC3 | I3 | CC4 | I4 |
| Oxidation induction time (in min) | 73 | 213 | 118 | >250 |

These results demonstrate that adding a spiroboronate compound in accordance with the invention can significantly improve the oxidation stability of the lubricant.

Engine Cleanliness Test

Finally, the lubricants CC3 and I3 were evaluated using the TDI3 engine test in accordance with the CEC L-117-20 method which in particular measures the cleanliness of the pistons. The results are summarized in Table 6 below.

TABLE 7

|  | Lubricant | |
|---|---|---|
|  | CC3 | I3 |
| TDI CEC L-117-20 | 52 | 58 |

It can be seen that the lubricating composition in accordance with the invention can also improve the cleanliness of the engine.

Example 4

Evaluation of the Stability of the Spiroboronate Compound in the Presence of Water The stability of a spiroboronate compound in accordance with the invention with respect to water was evaluated as described below.

The spiroboronate compound that was tested was a spiro compound with formula (I) in which M is a boron atom, R each representing an octadecyl chain (C18) and n1 and n2 equaling 1, in other words has the following formula:

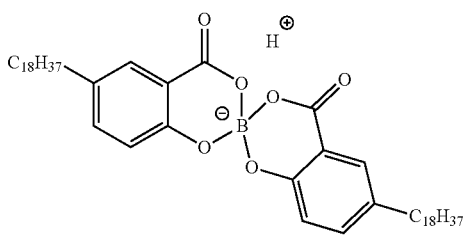

The spiroboronate compound was prepared from a previously synthesized salicylic acid derivative (2-hydroxy-5-octadecylbenzoic acid) and boric acid.

The 2-hydroxy-5-octadecylbenzoic acid (8.9 g, 22.8 mmol, 2 eq) and boric acid (0.70 g, 11.4 mmol, 1.0 eq) in toluene (65 mL) were introduced into a 250 mL three-necked flask provided with a Dean-Stark apparatus to eliminate water and a mechanical stirrer, under nitrogen. The mixture was heated under reflux until the reaction was complete, and the spiroboronate compound was recovered.

The spiroboronate compound was dispersed in an amount of 5% by weight in water. The emulsion underwent vigorous stirring with a paddle, followed by strong stirring with the aid of an Ultra-Turrax© stirrer.

The emulsions obtained after each stir were stable. They were analyzed by laser granulometry using a Malvern Mastersizer 2000 granulometer.

FIG. 2 shows the particle size distribution for the emulsion obtained after paddle stirring (FIG. 2a) and after Ultra-Turrax© stirring (FIG. 2b).

The emulsion of spiroboronate in water was then passed to a vacuum rotary evaporator in order to evaporate off the water. The residue when evaporation of the water was complete was recovered and analyzed by $^1$H NMR.

The NMR spectrum of the residue was compared with that of pure spiroboronate compound. FIG. 3 shows the NMR spectra for pure spiroboronate (FIG. 3a) and for the residue obtained as described above (FIG. 3b).

The comparison of the two spectra shows that the residue obtained corresponded to the starting spiroboronate. Thus, the spiroboronate compound had not undergone hydrolysis in the presence of water.

The invention claimed is:

1. A method comprising adding at least one spiro compound to a lubricant comprising at least one base oil, the spiro compound(s) being represented by formula (I):

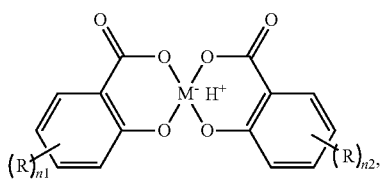

wherein:
M is chosen from boron or aluminum;
n1 and n2 are independently selected from 0, 1, or 2; and
each R independently represents a hydrocarbon group comprising from 1 to 50 carbon atoms.

2. The method of claim 1, wherein each R independently represents a linear or branched aliphatic chain.

3. The method of claim 1, wherein:
n1 and n2 are 1; and
each R is identical.

4. The method of claim 1, wherein M is boron.

5. The method of claim 1, wherein the lubricant comprises from 0.1 to 20% by weight of the spiro compound(s), based on the total weight of the lubricant.

6. The method of claim 1, wherein the lubricant comprises at least one metallic detergent additive selected from calcium salts, magnesium salts, or a combination thereof.

7. The method of claim 6, wherein the lubricant comprises 15% by weight or less of the metallic detergent additive(s), based on the total weight of the lubricant.

8. The method of claim 1, wherein the lubricant comprises at least 50% by weight of the base oil(s), based on the total weight of the lubricant.

9. The method of claim 1, wherein the lubricant further comprises at least one additive chosen from friction modifiers, anti-wear additives, extreme pressure additives, anti-oxidants, viscosity index improvers, pour point depressant additives, dispersing agents, anti-foaming agents, thickening agents, corrosion inhibitors, or mixtures thereof.

10. The method of claim 1, further comprising using the lubricant to lubricate a diesel, gasoline, gas, or dual fuel engine.

11. A lubricant for a motor, the lubricant comprising:
at least one base oil; and
at least one spiro compound represented by formula (I):

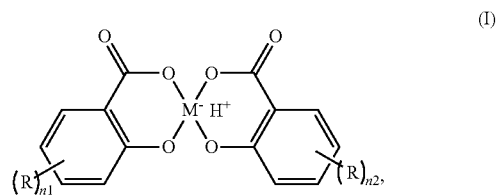

wherein:
M is chosen from boron or aluminum;
n1 and n2 are independently selected from 0, 1, or 2; and
each R group is independently selected from a hydrocarbon group comprising from 1 to 50 carbon atoms.

12. The lubricant of claim 11, wherein the lubricant comprises, based on a total weight of the lubricant:
from 1% to 2% by weight of the spiro compound; and
from 8% to 13.2% by weight of an additive package comprising:
at least one zinc dithiophosphate anti-wear agent;
at least one calcium-based detergent; and
at least one polyisobutylene succinimide (PIBSI) polymer dispersing agent.

13. The lubricant of claim 12, wherein:
M is boron; and
each R group comprises a $C_8$ to $C_{15}$ linear alkyl group.

14. The lubricant of claim 13, wherein the lubricant comprises from 0.5% to 5.0% by weight of the calcium-based detergent.

15. The lubricant of claim 14, further comprising from 2 to 10% by weight of a hydrogenated polyisoprene-styrene (PISH) viscosity index improver.

16. The lubricant of claim 15, wherein the lubricant comprises from 4.8% to 6.8% by weight of the PISH viscosity index improver.

17. The lubricant of claim 15, wherein the lubricant comprises from 70 to 90% by weight of the base oil.

18. The lubricant of claim 15, wherein the base oil comprises a Group III base oil.

* * * * *